United States Patent
Kawada et al.

(10) Patent No.: US 11,230,056 B2
(45) Date of Patent: Jan. 25, 2022

(54) LAMINATION MOLDING APPARATUS

(71) Applicant: Sodick Co., Ltd., Kanagawa (JP)

(72) Inventors: Shuichi Kawada, Yokohama (JP);
Tsuyoshi Saito, Yokohama (JP)

(73) Assignee: SODICK CO., LTD., Kanagawa (JP)

( * ) Notice: Subject to any disclaimer, the term of this patent is extended or adjusted under 35 U.S.C. 154(b) by 150 days.

(21) Appl. No.: 16/775,603

(22) Filed: Jan. 29, 2020

(65) Prior Publication Data

US 2021/0016502 A1 Jan. 21, 2021

(30) Foreign Application Priority Data

Jul. 17, 2019 (JP) .............................. JP2019-131836

(51) Int. Cl.
*B29C 64/209* (2017.01)
*B22F 3/00* (2021.01)
(Continued)

(52) U.S. Cl.
CPC ............ *B29C 64/209* (2017.08); *B22F 3/004* (2013.01); *B22F 12/52* (2021.01); *B22F 12/53* (2021.01);
(Continued)

(58) Field of Classification Search
CPC .......... B22F 3/004; B22F 12/50; B22F 12/52; B22F 12/53; B22F 12/55; B22F 12/57; B29C 64/205; B29C 64/209
See application file for complete search history.

(56) References Cited

U.S. PATENT DOCUMENTS 5,647,931 A * 7/1997 Retallick ................ B22F 12/00
156/73.6
7,665,636 B2 * 2/2010 Ederer .................... B33Y 30/00
222/409

(Continued)

FOREIGN PATENT DOCUMENTS

| JP | 5841650 B1 | 1/2016 |
| JP | 2016-196694 A | 11/2016 |
| JP | 2017-171976 A | 9/2017 |

OTHER PUBLICATIONS

Japanese Office Action dated May 19, 2020, in connection with corresponding JP Application No. 2019-131836 (3 pgs., including machine-generated English translation).

*Primary Examiner* — Atul P. Khare
(74) *Attorney, Agent, or Firm* — Maier & Maier, PLLC

(57) ABSTRACT

A lamination molding apparatus capable of stably supplying material powder on a molding table. Provided is a lamination molding apparatus including a chamber, a recoater head, and a recoater head driving mechanism. The chamber covers a molding region. The recoater head comprises a material case and is configured to be moved so as to form a material powder layer. The material case includes a case outlet for discharging the material powder and a pair of inclined side surfaces arranged with the case outlet interposed therebetween. The inclined side surfaces are inclined toward the case outlet so that inclination angles between a horizontal plane and the inclined side surfaces are different from each other. The recoater head driving mechanism includes a motor and a control unit, and the control unit is configured to vibrate the recoater head to facilitate discharge of the material powder.

12 Claims, 9 Drawing Sheets

(51) Int. Cl.
  *B29C 64/153* (2017.01)
  *B29C 64/227* (2017.01)
  *B29C 64/371* (2017.01)
  *B29C 64/386* (2017.01)
  *B29C 64/236* (2017.01)
  *B22F 12/52* (2021.01)
  *B22F 12/55* (2021.01)
  *B22F 12/57* (2021.01)
  *B22F 12/53* (2021.01)
  *B33Y 30/00* (2015.01)

(52) U.S. Cl.
  CPC .............. *B22F 12/55* (2021.01); *B22F 12/57* (2021.01); *B29C 64/153* (2017.08); *B29C 64/227* (2017.08); *B29C 64/236* (2017.08); *B29C 64/371* (2017.08); *B29C 64/386* (2017.08); *B33Y 30/00* (2014.12)

(56) References Cited

U.S. PATENT DOCUMENTS

| | | | | |
|---|---|---|---|---|
| 7,748,971 | B2* | 7/2010 | Hochsmann | B29C 41/12 425/90 |
| 9,156,056 | B2* | 10/2015 | Abe | B05C 19/04 |
| 9,604,410 | B2* | 3/2017 | Okazaki | B29C 64/153 |
| 10,059,058 | B2* | 8/2018 | Hartmann | B29C 64/153 |
| 10,507,549 | B2* | 12/2019 | Buller | B23K 26/123 |
| 11,103,928 | B2* | 8/2021 | Redding | B22F 10/20 |
| 2012/0145806 | A1* | 6/2012 | Yang | G01F 13/001 239/102.1 |
| 2016/0107232 | A1 | 4/2016 | Okazaki et al. | |
| 2017/0274590 | A1 | 9/2017 | Okazaki | |
| 2018/0015666 | A1* | 1/2018 | Honda | B22F 10/20 |
| 2018/0111319 | A1* | 4/2018 | Brezoczky | B23K 26/14 |

* cited by examiner

LAMINATION MOLDING APPARATUS

TECHNICAL FIELD

The present invention relates to a lamination molding apparatus.

BACKGROUND ART

In metal lamination molding, for example, a lamination molding apparatus is known, in which a plurality of solidified layers is laminated to form a desired three-dimensional object by repeating the following procedures: forming a material powder layer on a molding table including a molding region inside a sealed chamber filled with an inert gas; irradiating a predetermined region corresponding the desired three-dimensional object with a laser beam or an electron beam to sinter or melt material powder in the predetermined region; and cooling and solidifying the sintered or melted material powder. The material powder layer is formed by freely dropping and supplying the material powder in the molding region on a molding table and planarizing the supplied material powder while moving a recoater head in a horizontal direction so as to pass over the molding table.

Metal powder composed of fine metal particles of an alloy is generally used as the material powder, and the fluidity and the agglomeration property thereof vary depending on the type, size, shape and the like of the metal particles. In forming the material powder layer, the material powder needs to be stably supplied and accommodated in a material holding section of the recoater head. Patent Literature 1 discloses a lamination molding apparatus comprising a material supply unit capable of stably supplying the material powder to the recoater head. When the material powder is distributed by the recoater head, it is further necessary to stably supply the material powder accommodated in the material holding section from a material discharging section of the recoater head onto the molding table.

CITATION LIST

Patent Literature

[Patent Literature 1] JP-B-5841650

SUMMARY OF INVENTION

Technical Problem

When metal powder having high fluidity and low agglomeration property is used as the material powder, the metal powder can be stably and uniformly supplied onto the molding table without being agglomerated or causing clogging. However, when metal powder having relatively low fluidity or high agglomeration property is used as the metal powder, the material powder is often agglomerated, and the supply is delayed. At this time, the metal powder is not always agglomerated at the same position in the recoater head. Further, even if the metal powder with high fluidity or low agglomeration property is used, when it is once used for molding and recovered as a surplus for reuse, the fluidity decreases or the agglomeration property increases, and thus, the material powder may not be supplied smoothly. There are several reasons why the fluidity of the metal powder once distributed decreases or the agglomeration property increases. For example, the metal powder absorbs moisture during recovery or storage. Further, the surface of the metal particles is scraped as a result of collision of metal particles during recovery, and thus the space between metal particles is reduced. Consequently, the metal particles are brought closer to each other, and the filling property is increased, in other words, the bulk density is increased.

The present invention has been made in view of such circumstances and is aimed at providing a lamination molding apparatus capable of suppressing the clogging of the material powder in the recoater head and stably supplying the material powder onto the molding table, regardless of the type of metal particles.

Solution to Problem

According to the present invention, provided is a lamination molding apparatus comprising a chamber, a recoater head, and a recoater head driving mechanism, wherein the chamber covers a required molding region and is filled with an inert gas at a predetermined concentration; the recoater head comprises a material case for accommodating material powder and an outer frame supporting the material case and is configured to be moved in a horizontal direction by the recoater head driving mechanism so as to form a material powder layer by supplying and planarizing the material powder while moving in the chamber; the material case comprises a case outlet for discharging the material powder accommodated inside and a pair of inclined side surfaces arranged with the case outlet interposed therebetween; the pair of inclined side surfaces are inclined toward the case outlet so that inclination angles between a horizontal plane and the inclined side surfaces are different from each other; the recoater head driving mechanism comprises a motor for moving the recoater head and a control unit; and the control unit is configured to vibrate the recoater head to facilitate discharge of the material powder.

Advantageous Effects of Invention

In the lamination molding apparatus of the present invention, a pair of side surfaces of the material case is configured to have different inclination angles. Such a configuration enables the material powder to fall toward the case outlet at different speeds, and thus the agglomeration of the material powder can be suppressed. In addition, the control unit vibrates the recoater head to eliminate clogging with the material powder and facilitate the fall of the material powder, so that the material powder can be more reliably and stably supplied onto the molding table. Further, since this configuration does not attempt to suppress the agglomeration of the material powder by adding any additive to the material powder, it is not necessary to consider the change in material composition and the influence on the characteristics of the three-dimensional object due to the additive.

Hereinafter, various embodiments of the present invention will be exemplified. The embodiments described below can be combined with each other.

Preferably, the material case is supported so as to be able to oscillate with respect to the outer frame.

Preferably, the material case comprises a pair of sleeves projecting at both longitudinal ends and is supported at supporting points arranged on each of the sleeves.

Preferably, the supporting points on the pair of sleeves are shifted from each other in a shorter direction of the material case.

Preferably, the control unit is configured to vibrate the recoater head by means of the motor.

Preferably, the recoater head further comprises an ultrasonic vibrator controlled by the control unit, and the control unit is configured to vibrate the recoater head by means of the ultrasonic vibrator.

Preferably, the control unit is configured to vibrate the recoater head when the recoater head is outside the molding region and configured not to vibrate the recoater head when the recoater head is within the molding region.

Preferably, the recoater head further comprises a sensor in the material case, for detecting an amount of the material powder, and the sensor is arranged above a center of the material case in a vertical direction.

Preferably, the recoater head comprises a powder guide provided immediately below the case outlet of the material case and configured to guide the material powder so that the material powder flowing out from the case outlet freely falls to a predetermined position on the molding region.

Preferably, the powder guide is characterized in that an opening size is changed in accordance with fluidity or agglomeration property of the material powder.

DESCRIPTION OF EMBODIMENTS

Hereinafter, embodiments of the present invention will be described with reference to the drawings. Various characteristics described in the embodiments below can be combined with each other.

(Lamination Molding Apparatus)

Figure 1:
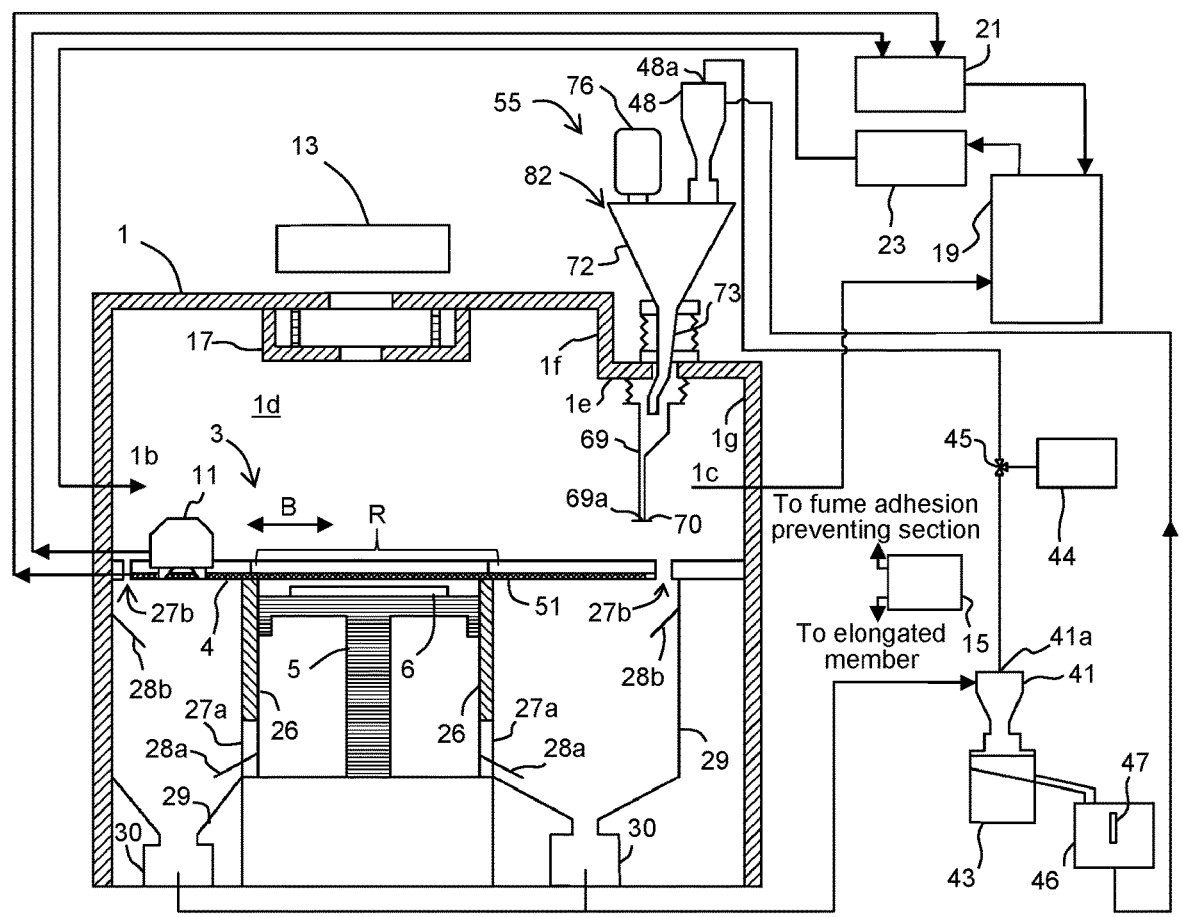
FIG. 1 is a schematic diagram of a lamination molding apparatus according to an embodiment of the present invention.
Figure 2:
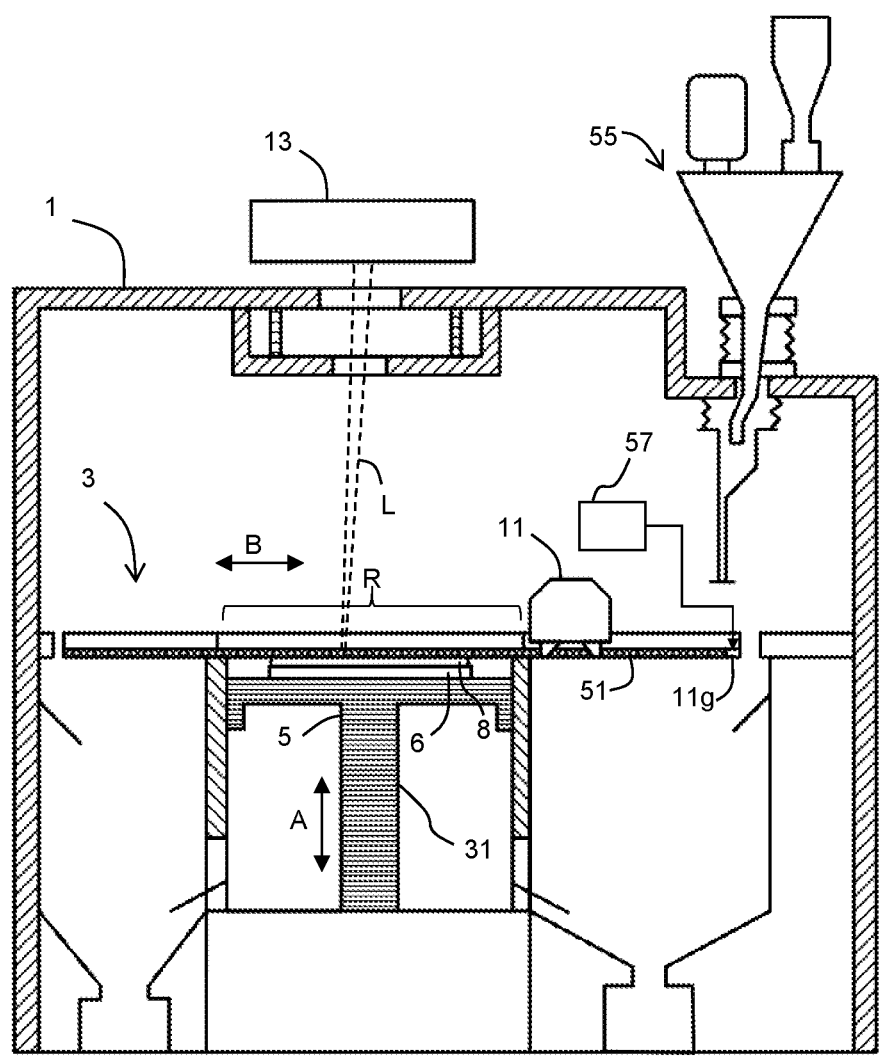
FIG. 2 is a schematic diagram of the lamination molding apparatus according to the embodiment of the present invention.

As shown in FIG. 1 and FIG. 2, a lamination molding apparatus of an embodiment of the present invention comprises a chamber 1, a recoater head 11, and a recoater head driving mechanism 51.

The chamber 1 covers a required molding region R and is filled with an inert gas at a predetermined concentration. In the present specification, the "inert gas" is a gas that does not substantially react with material powder, and examples thereof include nitrogen gas, argon gas, and helium gas.

Figure 3:
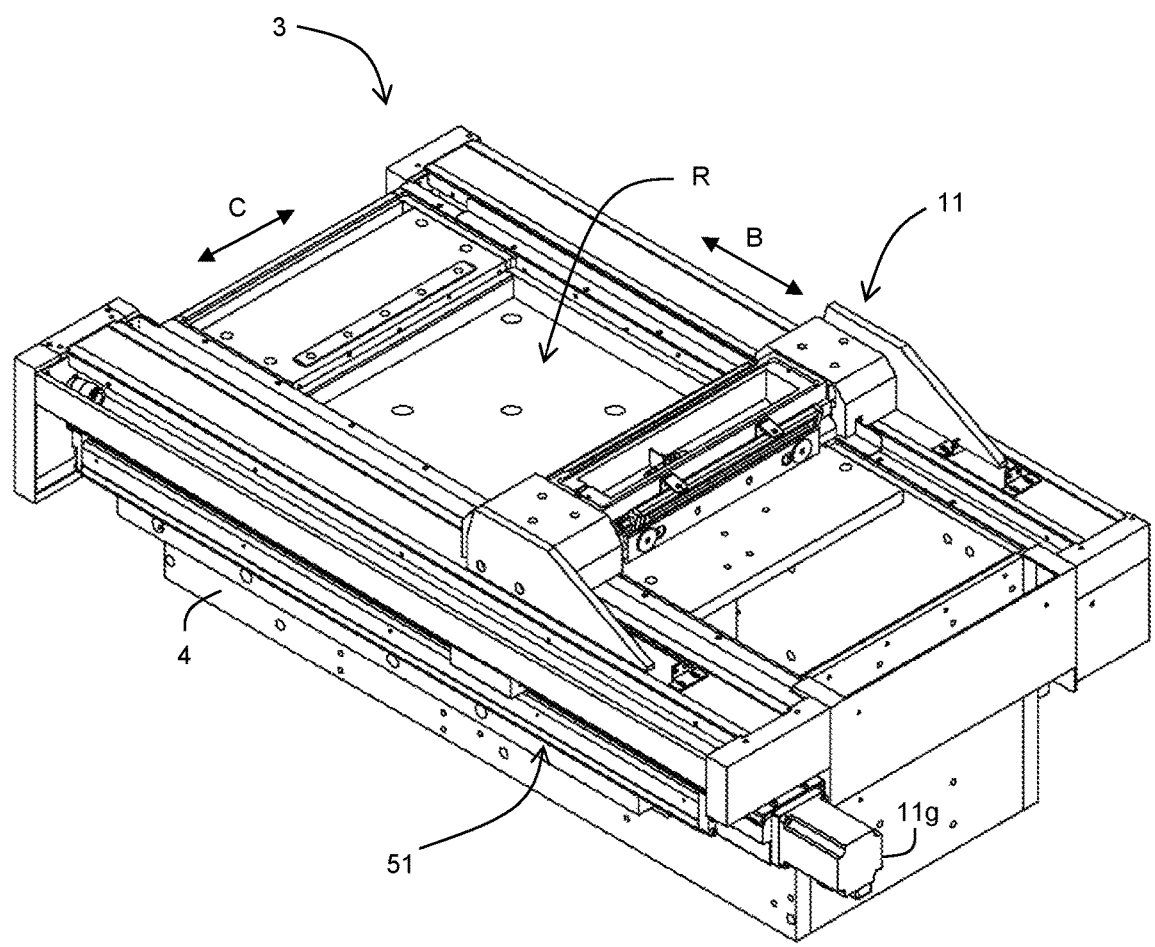
FIG. 3 is a perspective view of a powder layer forming device 3.

A powder layer forming device 3 is provided inside the chamber 1. As shown in FIG. 3, the powder layer forming device 3 comprises a base 4 including the molding region R, and the recoater head 11 arranged on the base 4. The recoater head 11 is configured to be reciprocally moved in a horizontal one-axis direction (a direction of an arrow B) by the recoater head driving mechanism 51. The recoater head 11 supplies the material powder onto the molding region R and planarizes the material powder while moving in the chamber 1 to form a material powder layer 8.

As shown in FIG. 2, the molding region R is located on a molding table 5. The molding table 5 is driven by a molding table driving mechanism 31 and is movable in the vertical direction (a direction of an arrow A). At the time of molding, a base plate 6 is arranged on the molding table 5, and the material powder layer 8 is formed thereon.

Figure 4:
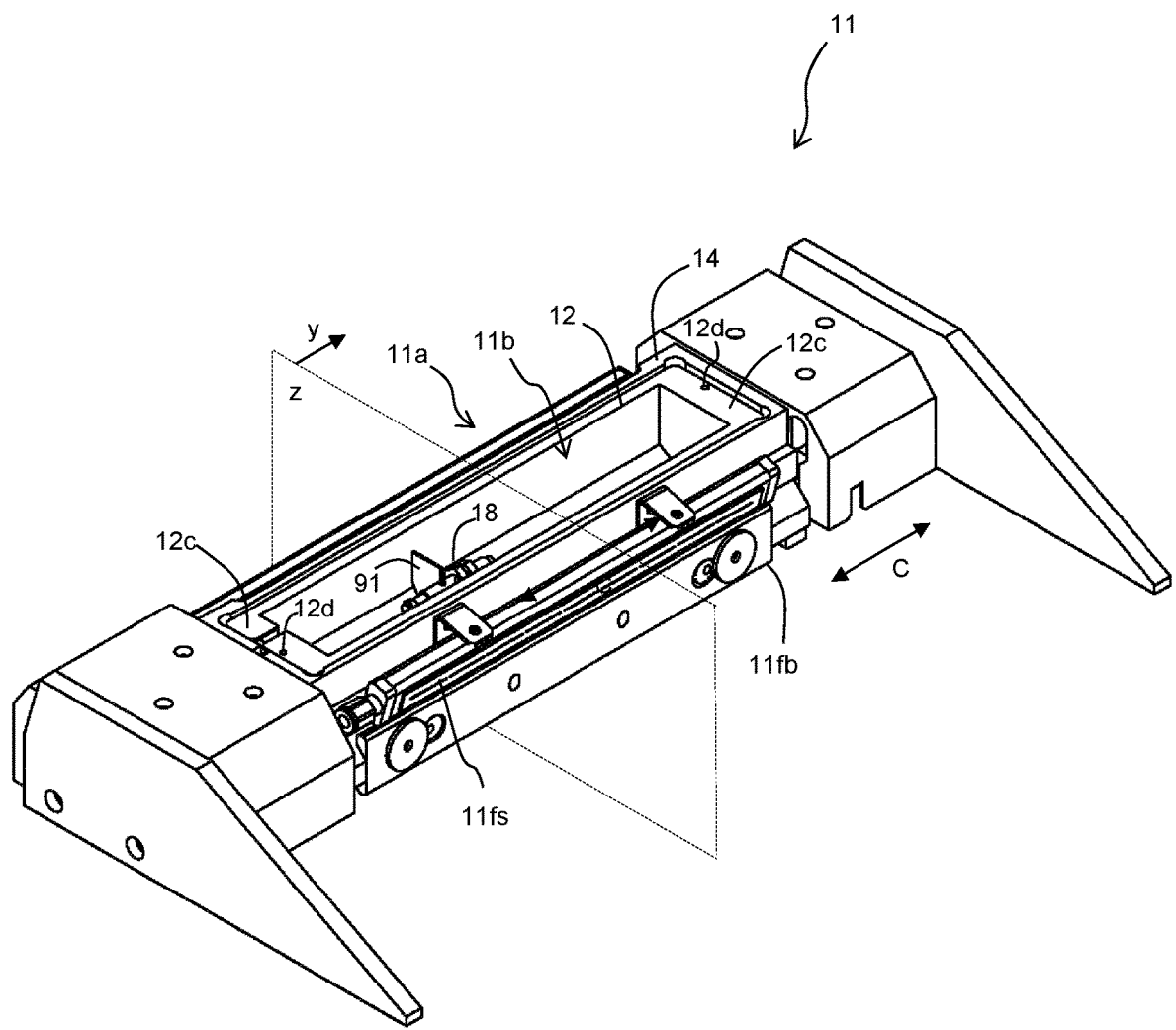
FIG. 4 is a perspective view of a recoater head 11.
Figure 5:
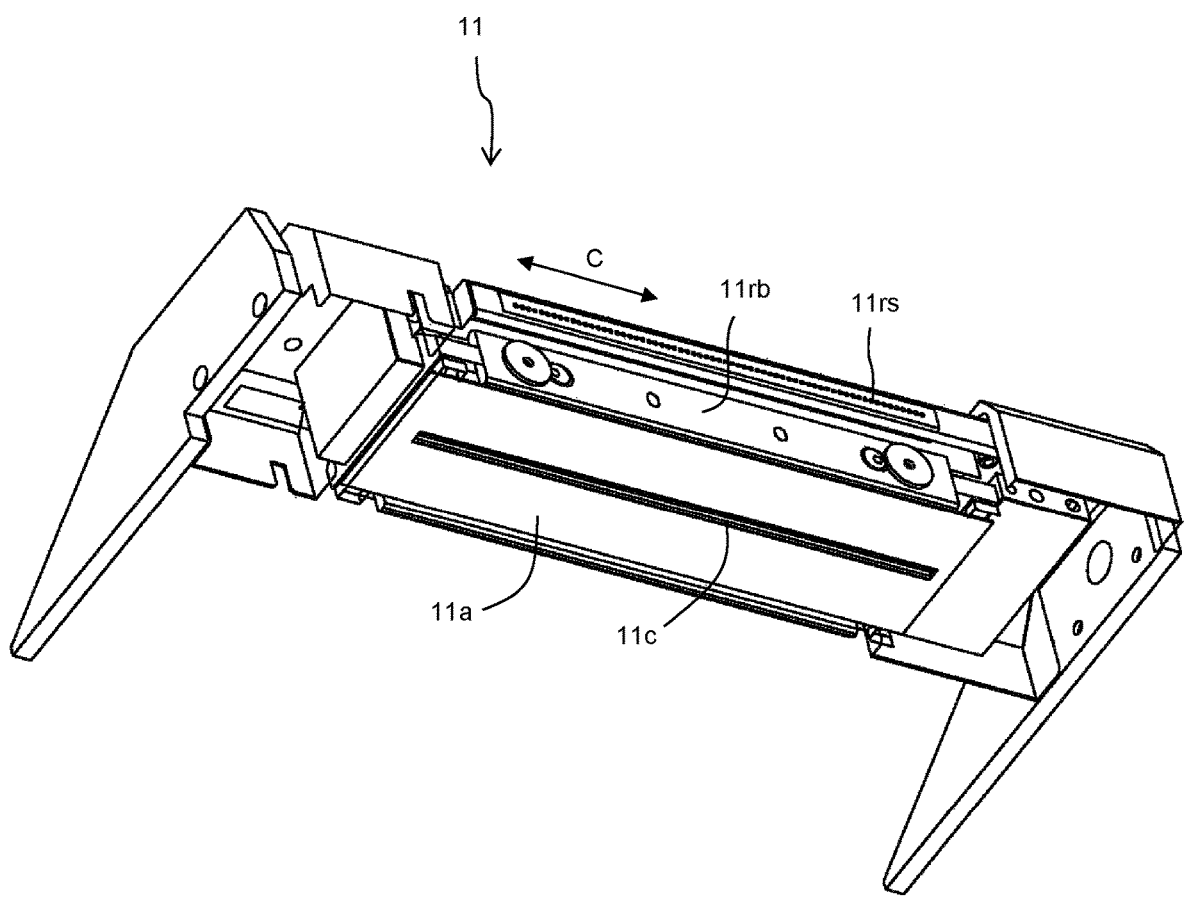
FIG. 5 is a perspective view of the recoater head 11 from another angle.

As shown in FIG. 4 and FIG. 5, the recoater head 11 comprises a material holding section 11a, a material supplying section 11b, and a material discharging section 11c. The material holding section 11a comprises a material case 12 for accommodating material powder, and the outer frame 14 supporting the material case 12. The material powder is metal powder containing a plurality of types of metal elements (for example, elements constituting carbon steel) at a predetermined ratio. Each metal particle has, for example, a spherical shape with an average particle diameter of 20 µm. The material case 12 and the outer frame 14 extend in another horizontal one-axis direction (a direction of an arrow C) orthogonal to the moving direction of the recoater head 11 (the direction of the arrow B in FIG. 1 and FIG. 3), and the material case 12 is configured such that a longitudinal length thereof along the horizontal one-axis direction is equal to or larger than the width of the molding region R in the direction of the arrow C. A sensor 18 for detecting the amount of the material powder in the material case 12 is fixed inside the material case 12 by a fixing plate 91. In this regard, although one sensor 18 is provided in the present embodiment, a plurality of sensors 18 may be provided according to the number and positions of intermediate duct shutters 70 described later.

The material supplying section 11b is provided on an upper surface of the material holding section 11a and serves as a receiving port for the material powder supplied from a material supply unit 55 to the material case 12 of the material holding section 11a. The material discharging section 11c is provided on a bottom surface of the material holding section 11a and discharges the material powder in the material holding section 11a. The material discharging section 11c has a slit shape extending in the direction of the arrow C, which is the longitudinal direction of the material case 12. Blades 11fb, 11rb are provided on both side surfaces of the recoater head 11. The blades 11fb, 11rb planarize the material powder discharged from the material discharging section 11c to form the material powder layer. Further, on both side surfaces of the recoater head 11, fume suction sections 11fs, 11rs are provided for sucking fumes generated when the material powder is solidified. The fume suction sections 11fs, 11rs are provided along the direction of the arrow C.

As shown in FIG. 2, an irradiation device 13 is provided above the chamber 1. The irradiation device 13 irradiates a predetermined portion of the material powder layer 8 formed on the molding region R with a laser beam L to solidify the material powder at the irradiated position. The irradiation device 13 may be any device capable of performing irradiation with a laser beam or an electron beam to solidify the material powder. As the laser beam L, for example, a $CO_2$ laser, a fiber laser, a YAG laser or the like can be used. Further, a cutting device (not illustrated) may be provided in the chamber 1 in order to perform machining after or during molding of the molded object, on the surface and unnecessary portions of the solidified body obtained by laminating the solidified layers.

Figure 6:
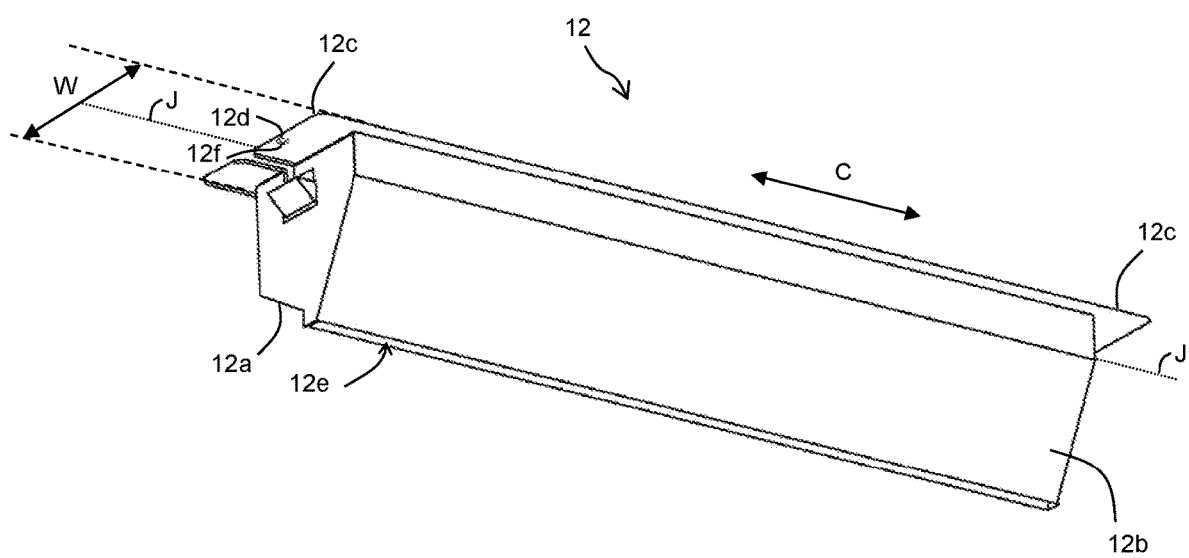
FIG. 6 is a perspective view of a material case 12.
Figure 7:
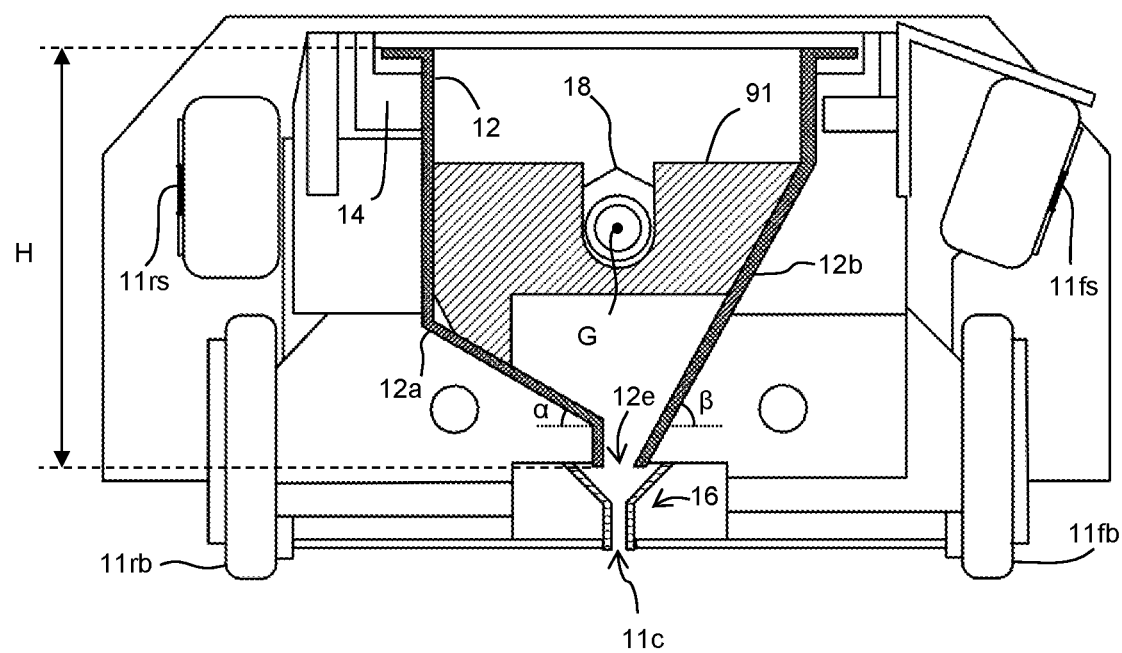
FIG. 7 is a schematic view of a cross section of the recoater head 11 in FIG. 4 which is taken along a plane z along a fixing plate 91 of a sensor 18, as viewed in a y direction.

FIG. 6 is a perspective view of the material case 12, and FIG. 7 is a schematic view of a cross section of the recoater head 11 in FIG. 4 which is taken along a plane z along the fixing plate 91 of the sensor 18, as viewed in a y direction. The material case 12 of the material holding section 11a comprises a case outlet 12e for discharging the material powder therein, a first inclined side surface 12a, and a second inclined side surface 12b. The case outlet 12e extends in substantially the same direction as the material discharging section 11c. The first inclined side surface 12a and the second inclined side surface 12b are arranged along the direction of the arrow C in FIG. 4, with the case outlet 12e interposed therebetween and are inclined toward the case outlet 12e so that inclination angles $\alpha$, $\beta$ between the horizontal plane and the inclined side surfaces are different from each other. The inclination angles $\alpha$, $\beta$ of the first inclined side surface 12a and the second inclined side surface 12b are not limited as long as they are different from each other, but in practice, the inclination angle $\alpha$ of the first inclined side surface 12a is suitably 10 to 45 degrees. For example, $\alpha$ is 30 degrees in the embodiment shown in FIG. 7. The inclination angle $\beta$ of the second inclined side surface 12b is suitably 45 to 85 degrees. For example, $\beta$ is 60 degrees in the embodiment shown in FIG. 7. The difference between the inclination angle $\alpha$ of the first inclined side surface 12a and the inclination angle $\beta$ of the second inclined side surface 12b is, for example, 10 to 50 degrees, and the difference is 30 degrees in the embodiment shown in FIG. 7. Such a configuration enables the material powder in the material case 12 to fall along each of the inclined side surfaces 12a, 12b at different speeds toward the case outlet 12e, and thus the material powder is less likely to agglomerate inside the material case 12. In the present embodiment, as shown in the cross-sectional view in FIG. 7, the first inclined side surface 12a having the smaller inclination angle $\alpha$ is arranged on the left side, while the second inclined side surface 12b having the larger inclination angle $\beta$ is arranged on the right side. In this regard, the arrangement of the first inclined side surface 12a and the second inclined side surface 12b may be reversed.

In the recoater head 11 of the present embodiment, a powder guide 16 is provided immediately below the case outlet 12e between the case outlet 12e of the material case 12 and the material discharging section 11c. The powder guide 16 is configured to guide the flow of the material powder. With such a configuration, the material powder flowing down from the case outlet 12e can freely falls in a space formed between an upper surface of the base plate 6 and a lower surface of the material holding section 11a and is supplied to a predetermined position on the base plate 6. Preferably, the opening width or the opening area of the powder guide 16 is configured to be variable in accordance with the type of powder material, for example, fluidity.

In the present embodiment, the first inclined side surface 12a is configured to extend in the vertical direction in the vicinity of the case outlet 12e in order to avoid interference between the material case 12 and the powder guide 16. The inclination angle of the inclined side surface may be appropriately changed in the vicinity of the case outlet 12e in accordance with the structural relationship with other components.

As shown in FIG. 2 and FIG. 3, the recoater head driving mechanism 51 comprises a motor 11g for moving the recoater head 11, and a control unit 57. The recoater head 11 is fixed to a slide member (not illustrated) to which a ball screw (not illustrated) is attached, and the recoater head 11 can be moved along with the slide member in the direction of the arrow B when the slide member is moved as the ball screw rotates. The ball screw is rotatably supported and is driven to rotate by the motor 11g.

The control unit 57 is configured to vibrate the recoater head 11 to promote the discharge of the material powder in the material case 12. In the present embodiment, the control unit 57 controls the motor 11g to repeatedly switch between normal and reverse rotations and moves the recoater head 11 back and forth in the horizontal one-axis direction (the direction of the arrow B) to vibrate the recoater head 11. Although the vibration is performed at a constant frequency between 1 Hz to 20 Hz inclusive in the present embodiment, the recoater head 11 may be irregularly vibrated. With such a configuration, the agglomeration of the material powder in the material case 12 can be further suppressed, and the clogging with the agglomerated material powder can be eliminated to promote the discharge of the material powder from the case outlet 12e. In this regard, the driving of the recoater head 11 is not limited to the method described above in which the rotary motor and the ball screw are used in combination, and for example, a linear motor may be used alternatively.

In FIG. 4 and FIG. 7, the material case 12 is supported so as to be able to oscillate with respect to the outer frame 14. With such a configuration, when the recoater head 11 is vibrated, the material case 12 oscillates with respect to the outer frame 14 in a horizontal one-axis direction orthogonal to the longitudinal direction of the material case 12 (the moving direction of the recoater head 11), in other words, in a direction orthogonal to the pair of inclined side surfaces 12a, 12b. Consequently, the agglomeration of the material powder in the material case 12 can be further suppressed, and the clogging with the agglomerated material powder can be eliminated to promote the discharge of the material powder from the case outlet 12e. As shown in FIG. 4 and FIG. 6, in the present embodiment, the material case 12 comprises a pair of sleeves 12c projecting at both longitudinal ends and is supported by the outer frame 14, at two supporting points 12d arranged on each of the sleeves 12c. Since the material case 12 is supported at the two points, the material case 12 is not completely fixed and can oscillate with respect to the outer frame 14. Here, although the material case 12 is supported at the supporting points 12d by the outer frame 14 via screws 12f, other support means may be used.

Further, the two supporting points 12d on the sleeves 12c are shifted from each other in a shorter direction of the material case 12. The positions of the two supporting points 12d are not particularly limited as long as they are shifted from each other in the shorter direction. For example, the two supporting points 12d can be arranged on opposite sides across a line passing through the center of the material case 12 in the shorter direction. That is, in FIG. 6, the two supporting points 12d are arranged on each of the sleeves 12c, interposing therebetween a line J passing through a position 0.5W from one end of the material case 12 in the shorter direction, wherein W represents the length of the material case 12 in the shorter direction. With such a configuration, the material case 12 oscillates around an oscillation axis connecting the two supporting points 12d and gives irregular vibrations to the material powder inside, thereby further suppressing the agglomeration of the material powder.

The sensor 18 for detecting the amount of the material powder in the material case 12 is arranged such that the center of gravity G of the sensor 18 is above the center of the material case 12 in the vertical direction. That is, in FIG. 7, the center of gravity G of the sensor 18 is arranged above the height of 0.5H from a lower end of the material case 12, wherein H represents the height of the material case 12. The necessity of replenishing the material holding section 11a with the material powder is determined based on the detection by the sensor 18. Therefore, with such a configuration, a state in which a relatively large amount of material powder is accommodated in the material case 12 is maintained, and the center of gravity of the entire material case 12 including the sensor 18 and the accommodated material powder approaches the supporting points 12d of the material case 12. Consequently, the oscillation of the material case 12 is facilitated, and the agglomeration of the material powder inside can be further suppressed.

(Inert Gas Supply System and Fume Discharge System)

Next, a system for supplying an inert gas to the chamber 1 and a system for discharging fumes from the chamber 1 are described.

As shown in FIG. 1, an inert gas supplying device 15 and a fume collector 19 are connected to the system for supplying an inert gas to the chamber 1. The inert gas supplying device 15 has a function of supplying an inert gas, and is, for example, a gas cylinder of the inert gas. Duct boxes 21, 23 are arranged on an upstream and downstream sides of the fume collector 19. The gas discharged from the chamber 1 (inert gas containing fumes) is sent to the fume collector 19 through the duct box 21, and the inert gas from which the fumes have been removed in the fume collector 19 is sent to the chamber 1 through the duct box 23. Such a configuration enables the inert gas to be reused.

The inert gas supply system is connected to a supply opening 1b of the chamber 1, a fume adhesion preventing section 17, and one of two elongated members (not illustrated) provided on both sides of the molding region R along the moving direction of the recoater head 11 (the direction of the arrow B). The inert gas is filled into a molding space 1d of the chamber 1 through the supply opening 1b. The inert gas supplied to the elongated members is discharged from the molding region R through an opening.

In the present embodiment, the inert gas from the fume collector 19 is sent to the supply opening 1b, and the inert gas from the inert gas supplying device 15 is sent to the fume adhesion preventing section 17 and one of the elongated members. Therefore, according to the inert gas supply system of the present embodiment, the fume adhesion preventing section 17 provided to prevent fumes from adhering to a window attached to an upper surface of the chamber 1 and lowering the transmittance of the laser beam is provided with fresh inert gas from the inert gas supplying device 15. On the other hand, the inert gas purified by the fume collector 19 is supplied from the supply opening 1b for circulating and supplying the inert gas to the chamber 1. Therefore, the consumption of the fresh inert gas with a limited usable amount can be advantageously suppressed.

The system for discharging fumes from the chamber 1 is connected to a discharge opening 1c of the chamber 1 provided with an exhaust fan (not illustrated), the fume suction sections 11fs, 11rs of the recoater head 11, and the other of the two elongated members. The inert gas containing the fumes in the molding space 1d of the chamber 1 is discharged through the discharge opening 1c, so that a flow of the inert gas from the supply opening 1b toward the discharge opening 1c is formed in the molding space 1d. The fume suction sections 11fs, 11rs of the recoater head 11 can suck the fumes generated in the molding region R when the recoater head 11 passes over the molding region R. In addition, the inert gas containing the fumes is discharged out of the chamber 1 through the other of the elongated members. The fume discharge system is connected to the fume collector 19 via the duct box 21, and the inert gas is reused after the fumes are removed in the fume collector 19.

(Material Powder Supply/Recovery System)

Next, a supply system of the material powder to the chamber 1 and a recovery system of the material powder from the chamber 1 are described.

As shown in FIG. 1, the material supply unit 55 is provided at a position close to wall surfaces 1e, 1f, 1g of the chamber 1. The material supply unit 55 comprises an intermediate duct 69 and a main duct 82. New material powder is supplied from a material tank 76 to the main duct 82. The main duct 82 comprises a main duct lower section 73 and a main duct upper section 72 provided above the main duct lower section 73 and is configured such that the material powder supplied to the main duct upper section 72 is further supplied to the intermediate duct 69 through the main duct lower section 73.

The intermediate duct 69 is configured to discharge the material powder from an intermediate duct outlet 69a that is movable in the vertical direction and has an elongated shape (rectangular shape in the present embodiment). The intermediate duct outlet 69a extends in substantially the same direction as the material discharging section 11c of the recoater head 11.

The intermediate duct outlet 69a is opened and closed by one or more intermediate duct shutters 70. The intermediate duct outlet 69a is normally closed by the intermediate duct shutter 70. When it is determined by the sensor 18 that the material holding section 11a needs to be replenished with the material powder, the recoater head 11 is moved directly below the intermediate duct 69 of the material supply unit 55 and replenished with the material powder. When the material powder is supplied to the material case 12 of the material holding section 11a, the intermediate duct outlet 69a is opened at a position lower than an upper end of the material case 12, and then the material powder is discharged and supplied to the material case 12.

A powder retaining wall 26 is provided around the molding table 5, and unsolidified material powder is held in a powder holding space surrounded by the powder retaining wall 26 and the molding table 5. A lower part of the powder retaining wall 26 is provided with a lower powder discharging section 27a for discharging the material powder in the powder holding space. After the lamination molding is completed, the molding table 5 is lowered to discharge the unsolidified material powder and impurities such as cutting dust from the lower powder discharging section 27a. The discharged material powder is guided to a chute 29 by a chute guide 28a and is accommodated in a material-recovery bucket 30 through the chute 29.

The base 4 inside the chamber 1 is provided with at least one upper powder discharging section 27b that is formed outside the powder retaining wall 26 and communicates with the material-recovery bucket 30. Excess unsolidified material powder and impurities pushed out by the moving recoater head 11 are discharged from the powder discharging section 27b outside the powder retaining wall 26 and are guided to the chute 29 by a chute guide 28b to be accommodated in the material-recovery bucket 30. In this regard, the upper powder discharging section 27b may be configured to be opened and closed in a timely manner by a shutter (not illustrated).

The recovery system of the material powder from the chamber 1 are connected with a material-recovery conveying device 41, an impurity removing device 43, a suction device 44, a material supplying bucket 46, a material drying device 47, and a material-supply conveying device 48. The material-recovery conveying device 41 conveys the material powder containing the impurities in the material-recovery bucket 30 to the impurity removing device 43. The impurity removing device 43 removes the impurities from the conveyed material powder containing the impurities, and the material powder from which the impurities are removed by the impurity removing device 43 is accommodated in the material supplying bucket 46. The material drying device 47 dries the material powder in the material supplying bucket 46. The material-supply conveying device 48 is installed above the main duct 82 of the material supply unit 55 and is connected to the main duct upper section 72. The material powder dried by the material drying device 47 is supplied to the main duct upper section 72 by the material-supply conveying device 48. The material-recovery conveying device 41 and the material-supply conveying device 48 have a cyclone filter inside, and an exhaust port 41a and an exhaust port 48a of the filters are connected to the suction device 44 through a switching valve 45 by means of a pipe and the like. The suction device 44 has a suction power sufficient to suck gas and solid together. For example, a cleaner and the like may be employed. When the material powder and solids such as impurities are sucked together with gas by the suction device 44, the filter separates and drops only the solids from air flow by means of specific gravity difference. Thereby, the solids are conveyed, and only gas is suck from the exhaust ports 41a, 48a by the suction device 44. In this regard, the suction device 44 may be configured to be switched to the material-recovery conveying device 41 and the material-supply conveying device 48 by means of the switching valve 45. Alternatively, each of the material-recovery conveying device 41 and the material-supply conveying device 48 may be respectively and independently connected to one suction device 44.

(Method for Manufacturing a Three-Dimensional Molded Object)

Next, a method for manufacturing a lamination molded object is described.

First, the height of the molding table 5 is adjusted to an appropriate position while the base plate 6 is disposed on the molding table 5. At this time, the recoater head 11 with the material powder filled in the material case 12 of the material holding section 11a is located outside the molding region R (left side of the molding region R in FIG. 1). In this state, the control unit 57 uses the motor 11g and vibrates the recoater head 11 to eliminate clogging due to the material powder agglomerated in the material case 12.

The control unit 57 vibrates the recoater head 11 for a predetermined time and then stops the vibration. While the vibration is stopped, the recoater head 11 is moved from the left side to the right side of the molding region R in the direction of the arrow B of FIG. 1 to form a first material powder layer 8 on the molding table 5.

Figure 8:
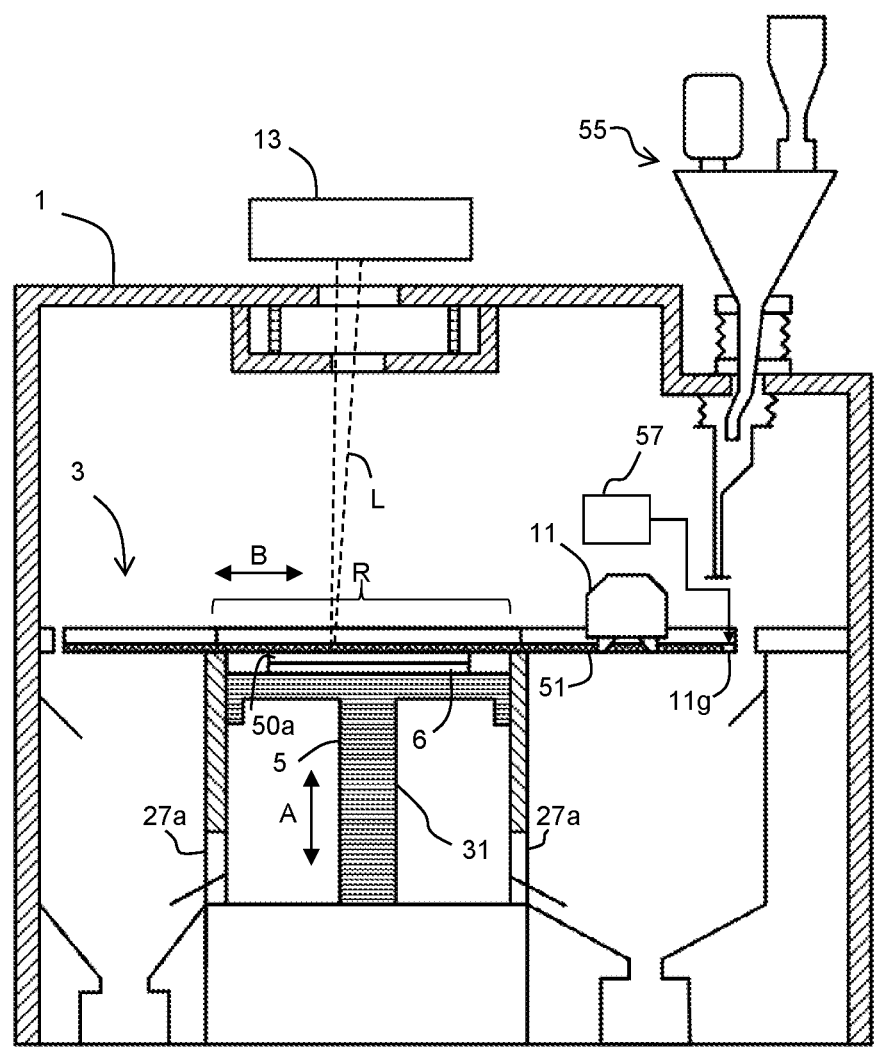
FIG. 8 is a drawing showing a lamination molding method using the lamination molding apparatus of the embodiment of the present invention.

As shown in FIG. 8, a predetermined portion of the material powder layer 8 is then irradiated with the laser beam L and solidified to obtain a first solidified layer 50a.

After forming the first material powder layer, the recoater head 11 is moved outside the molding region R (on the right side of the molding region R in FIG. 8). In this state, the control unit 57 uses the motor 11g and vibrates the recoater head 11 again to eliminate clogging due to the material powder agglomerated in the material case 12.

After forming the first solidified layer 50a, the height of the molding table 5 is lowered by one material powder layer. The control unit 57 vibrates the recoater head 11 for a predetermined time and then stops the vibration. While the vibration is stopped, the recoater head 11 is moved from the right side to the left side of the molding region R to form a second material powder layer on the molding table 5 so as to cover the solidified layer 50a. A predetermined portion of the material powder layer is then irradiated with the laser and solidified by the same method as described above to obtain a second solidified layer 50b, as shown in FIG. 9.

Figure 9:
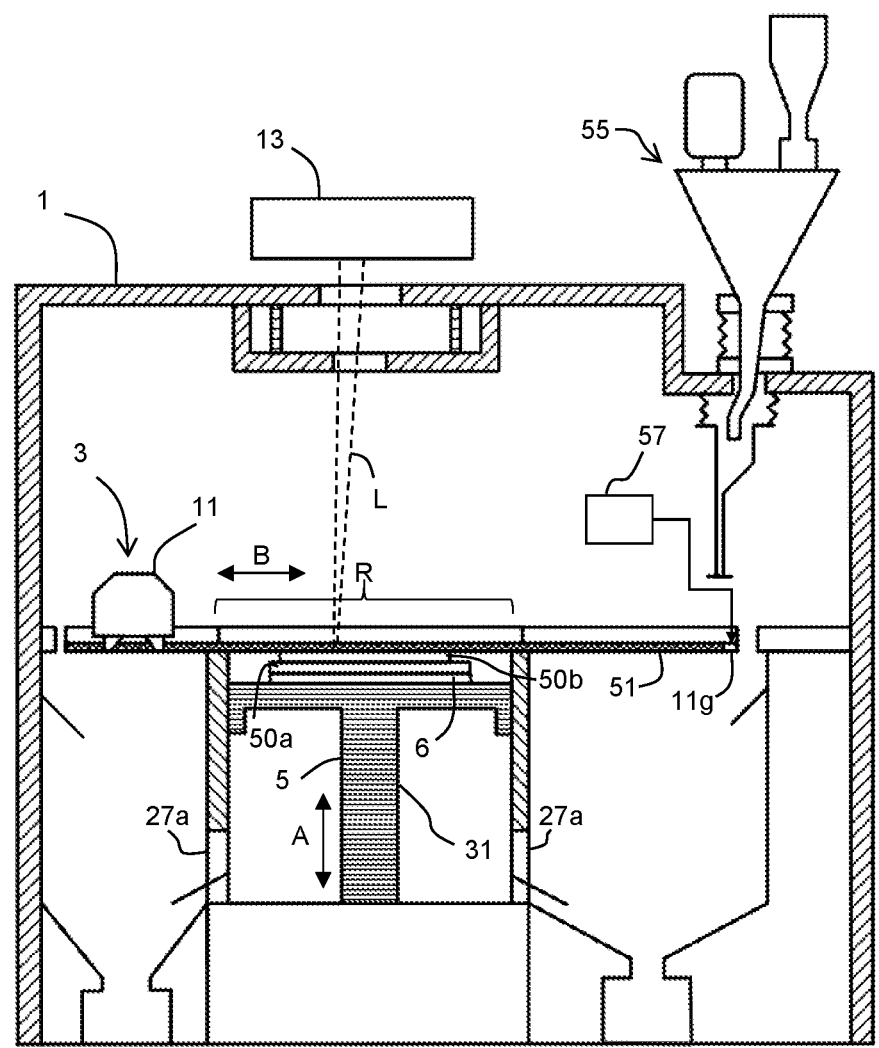
FIG. 9 is a drawing showing the lamination molding method using the lamination molding apparatus of the embodiment of the present invention.

After forming the second solidified layer 50b, the recoater head 11 returns to the outside of the molding region R (on the left side of the molding region R in FIG. 9). Third and subsequent solidified layers are formed by repeating the steps described above. Adjacent solidified layers are firmly fixed to each other.

After the lamination molding is completed, the unsolidified material powder is discharged through the powder discharging section 27a to obtain the molded object.

The control unit 57 vibrates the recoater head 11 every time a layer is formed in a state where the recoater head 11 is outside the molding region R. With such a configuration, the agglomeration of the material powder in the material case 12 is suppressed, and clogging due to the agglomerated material powder is eliminated. Consequently, the material powder is easily discharged from the case outlet 12e to the powder guide 16. In addition, the control unit 57 vibrates the recoater head 11 for a predetermined time and then stops the vibration. The recoater head 11 is moved in the molding region R while the vibration is stopped. Consequently, the influence on the formed material powder layer, such as the deterioration of the surface state due to the vibrations, hardly occurs.

The recoater head 11 may be vibrated by the control unit 57 every time one layer is formed or every time a predetermined plurality of layers is formed. For example, the vibration may be performed only when the recoater head 11 is located on the left side of the molding region R (in a state of FIG. 1), that is, every time the recoater head 11 reciprocates the molding region R to form two layers.

Other Embodiments

The vibration of the recoater head 11 by the control unit 57 is not limited to the method described above using the motor 11g. For example, an ultrasonic vibrator may be attached to an outer side surface of the material case 12 to vibrate the recoater head 11 by controlling the ultrasonic vibrator by the control unit 57.

REFERENCE SIGN LIST

1: chamber, 1b: supply opening, 1c: discharge opening, 1d: molding space, 1e: wall surface, 1f: wall surface, 1g: wall surface, 3: powder layer forming device, 4: base, 5: molding table, 6: base plate, 8: material powder layer, 11: recoater head, 11a: material holding section, 11b: material supplying section, 11c: material discharging section, 11fb: blade, 11fs: fume suction section, 11g: motor, 11rb: blade, 11rs: fume suction section, 12: material case, 12a: first inclined side surface, 12b: second inclined side surface, 12c: sleeve, 12d: supporting point, 12e: case outlet, 12f: screw, 13: irradiation device, 14: outer frame, 15: inert gas supplying device, 16: powder guide, 17: fume adhesion preventing section, 18: sensor, 19: fume collector, 21: duct box, 23: duct box, 26: powder retaining wall, 27a: powder discharging section, 27b: powder discharging section, 28a: chute guide, 28b: chute guide, 29: chute, 30: material-recovery bucket, 31: molding table driving mechanism, 41: material-recovery conveying device, 43: impurity removing device, 44: suction device, 45: switching valve, 46: material supplying bucket, 47: material drying device, 48: material-supply conveying device, 50a: solidified layer, 50b: solidified layer, 51: recoater head driving mechanism, 55: material supply unit, 57: control unit, 69: intermediate duct, 69a: intermediate duct outlet, 70: intermediate duct shutter, 72: main duct upper section, 73: main duct lower section, 76: material tank, 82: main duct, 91: fixing plate, G: center of gravity, L: laser beam, R: molding region

The invention claimed is:

1. A lamination molding apparatus comprising:
a chamber,
a recoater head, and
a recoater head driving mechanism,
wherein the chamber covers a molding region and is filled with an inert gas at a predetermined concentration,
the recoater head comprises a material case for accommodating material powder and an outer frame supporting the material case and is configured to be moved in a horizontal direction by the recoater head driving mechanism so as to form a material powder layer by supplying and planarizing the material powder onto the molding region while moving in the chamber,
the material case further comprises a case outlet for discharging the material powder accommodated inside the material case and a pair of inclined side surfaces arranged with the case outlet interposed therebetween,
the pair of inclined side surfaces are inclined toward the case outlet so that inclination angles between a horizontal plane and the inclined side surfaces differ from each other by 10 to 50 degrees,
the inclination angles are selected so the material powder falls along the inclined side surfaces at different speeds toward the case outlet with the inclination angle of a first of the inclined side surfaces terminating prior to the case outlet and with the inclination angle of a second of the inclined side surfaces extending to the case outlet,
the recoater head driving mechanism comprises a motor for moving the recoater head and a control unit, and
the control unit is configured to vibrate the recoater head to facilitate discharge of the material powder through the case outlet.

2. The lamination molding apparatus of claim 1, wherein the material case is supported so as to be able to oscillate with respect to the outer frame.

3. The lamination molding apparatus of claim 2, wherein the material case comprises a pair of sleeves projecting at longitudinal ends thereof and is supported at supporting points arranged on each of the sleeves.

4. The lamination molding apparatus of claim 3, wherein the supporting points on the pair of sleeves are shifted from each other in a shorter direction of the material case.

5. The lamination molding apparatus of claim 1, wherein the control unit is configured to vibrate the recoater head by means of the motor.

6. The lamination molding apparatus of claim 1, wherein the recoater head further comprises an ultrasonic vibrator controlled by the control unit, and
the control unit is configured to vibrate the recoater head by means of the ultrasonic vibrator.

7. The lamination molding apparatus of claim 1, wherein the control unit is configured to vibrate the recoater head when the recoater head is outside the molding region and is configured not to vibrate the recoater head when the recoater head is within the molding region.

8. The lamination molding apparatus of claim 1, wherein the recoater head further comprises a sensor in the material case for detecting an amount of the material powder, and
the sensor is arranged above a center of the material case in a vertical direction.

9. The lamination molding apparatus of claim 1, wherein the recoater head comprises a powder guide provided immediately below the case outlet of the material case and configured to guide the material powder so that the material powder flowing out from the case outlet freely falls to a predetermined position on the molding region.

10. The lamination molding apparatus of claim 9, wherein the powder guide is characterized in that an opening size thereof is configured to be changed in accordance with fluidity or agglomeration property of the material powder.

11. The lamination molding apparatus of claim 1, wherein the inclination angle of the first inclined side surface is 10 to 45 degrees and the inclination angle of the second inclined side surface is 45 to 85 degrees.

12. The lamination molding apparatus of claim 1, wherein the first inclined side surface extends vertically to the case outlet from where the inclination angle thereof terminates.

* * * * *